United States Patent [19]

Chun

[11] 4,238,465

[45] Dec. 9, 1980

[54] REMOVAL OF PHOSGENE FROM BORON TRICHLORIDE

[75] Inventor: Duk S. Chun, Uniontown, Ohio

[73] Assignee: PPG Industries, Inc., Pittsburgh, Pa.

[21] Appl. No.: 62,646

[22] Filed: Aug. 1, 1979

[51] Int. Cl.³ .............................................. C01B 35/06
[52] U.S. Cl. ................................... 423/240; 423/292; 423/487
[58] Field of Search ............... 423/240, 292, 481, 487, 423/488; 260/544 K

[56] References Cited

U.S. PATENT DOCUMENTS

| 1,220,411 | 3/1917 | Garner et al. | 423/487 |
| 3,126,256 | 3/1964 | Haimsohn et al. | 423/292 |
| 3,789,580 | 2/1974 | Allemang et al. | 423/240 X |

*Primary Examiner*—G. O. Peters
*Attorney, Agent, or Firm*—Irwin M. Stein

[57] ABSTRACT

Boron trichloride containing minor amounts of phosgene as an impurity is purified by contacting a vaporous stream thereof and at least a stoichiometric amount of hydrogen, based on the phosgene impurity, with a substantially metal-free carbon catalyst under substantially anhydrous conditions at temperatures of between about 300° C. and about 700° C.

13 Claims, No Drawings

REMOVAL OF PHOSGENE FROM BORON TRICHLORIDE

DESCRIPTION OF THE INVENTION

The present invention relates to an improved process for the purification of boron trichloride. More particularly, the present invention relates to the removal of phosgene from a vaporous stream of boron trichloride.

Boron trichloride is an article of commerce having established utilities. It can be prepared by passing chlorine over mixtures of boron oxide and carbon heated to elevated temperatures approximating 1,000° C. to 1,200° C. The chlorination reaction results in the formation of boron trichloride, phosgene, free chlorine and carbon monoxide. On condensing this mixture of of gases at temperatures approximating −10° C., the boron trichloride and the phosgene, which have closely similar boiling points, collect in the liquid phase and this liquid phase has a relatively high solubility for the free chlorine present in the gas mixture.

Boron trichloride can also be produced by chlorination of a borate ester, e.g., trimethyl borate, in a sealed tube. See, for example, U.S. Pat. No. 2,943,916. This process also produces phosgene as a by-product. A process for reducing the amount of phosgene by-product produced in the latter described process is described in commonly assigned U.S. patent application Ser. No. 23,858 of N. DeLue et al for Preparation of Boron Trichloride filed Mar. 26, 1979.

Phosgene can be present in unpurified boron trichloride in amount of 10 weight percent or less, e.g., less than about 5 weight percent. In the process described in the aforesaid patent application, phosgene levels of from about 1 to about 2.5 weight percent are typical.

The crude product, i.e., boron trichloride containing phosgene by-product, is useful for some purposes; but, for many uses, the phosgene interfers with the intended use. For example, boron trichloride is used extensively as a boron source to treat transistors and silicon wafers in solar cells. In such use, the phosgene present reacts with the silicon to produce carbon and oxygen impurities which poison the transistor or solar cell. Therefore, it is highly desirable to remove phosgene from the crude boron trichloride product. Due to their similar boiling points and closely related volatilities, the separation of phosgene form boron trichloride by distillation is not considered to be economically attractive.

Several methods have been proposed for eliminating phosgene from boron trichloride. Among the methods described in the United States patent literature are: catalyzed hydrolysis (U.S. Pat. Nos. 3,314,753 and 3,376,113); dissociation by carbon dioxide laser radiation (U.S. Pat. No. 4,063,896); refluxing with benzene or toluene in the presence of aluminum chloride (U.S. Pat. No. 2,920,942); contact with an alumina catalyst (U.S. Pat. Nos. 3,037,337, 3,411,867 and 3,789,580), a carbon catalyst (U.S. Pat. No. 3,126,256), or with boron carbide (U.S. Pat. No. 2,369,215); and contact with metals (U.S. Pat. Nos. 2,931,710, 3,043,665 and 3,207,581) or with carbon impregnated with metal or metal oxides (U.S. Pat. No. 1,519,470). U.S. Pat. No. 2,931,710 further describes the use of hydrogen to reactivate the metal, e.g., copper, used to purify the boron trichloride; however, the amount of hydrogen thus employed is between 5 and 10 percent by weight based on the boron trichloride stream purified, which is an order of magnitude higher than the amount of hydrogen used in the present process.

It has now been discovered that boron trichloride containing minor amounts of phosgene as an impurity can be purified by the step of contacting a stream thereof and at least a stoichiometric amount of hydrogen, based on the amount of phosgene present in the boron trichloride stream treated, in the vapor phase with a substantially metal-free carbon catalyst under substantially anhydrous conditions at temperatures of between about 300° C. and about 700° C. The aforesaid method removes phosgene from the boron trichloride stream, simultaneously forms hydrogen chloride and can produce boron trichloride substantially free of phosgene.

DETAILED DESCRIPTION OF THE INVENTION

The amount of hydrogen used in the practice of the present process is at least a stoichiometric amount based on the amount of phosgene present in the boron trichloride stream treated. By stoichiometric amount is meant the amount of hydrogen required by the following balanced equation:

$$COCl_2 + H_2 \rightarrow CO + 2HCl \quad (1)$$

i.e., one mole of hydrogen is required for each mole of phosgene present in the boron trichloride stream. Preferably, a molar excess of hydrogen is used to insure substantially complete removal of the phosgene. Commonly, the amount of excess hydrogen will be less than about 200 mole percent. Typically between about 25 and 100, e.g., 50, mole percent excess of hydrogen will be used. This excess hydrogen will also serve to remove elemental or free chlorine present in the boron trichloride stream. The mole percent hydrogen, as used herein and the accompanying claims, is based on the amount of phosgene present in the boron trichloride stream.

The hydrogen utilized should be substantially anhydrous as water present therein will react with the boron trichloride, thereby reducing the yield thereof. Further, the hydrolysis products of that reaction will produce boron oxides, which can plug flow lines, and hydrochloric acid, which is an extremely corrosive material. The amount of hydrogen used will vary with the amount of phosgene present in the boron trichloride stream and with the temperture used. Generally the lower the temperature, the higher the amount of excess hydrogen used and, conversely, the higher the temperature, the lower the amount of excess hydrogen used.

The hydrogen used can be added in any manner to the boron trichloride stream. It can be premixed with the boron trichloride before the boron trichloride is contacted with the carbon catalyst; or, the hydrogen can be added separately to the reactor vessel containing the carbon catalyst. Preferably, the hydrogen is added simultaneously with the boron trichloride in order to avoid deactivation of the carbon catalyst caused by adsorption by the catalyst of chlorine present in the boron trichloride stream, or chlorine generated by disassociation of the phosgene.

In accordance with the present process, the boron trichloride stream is treated at temperatures of between about 300° C. and about 700° C., preferably between about 350° and 550° C., e.g., between about 400° C. and 500° C. Although higher temperatures can be used, they are not required by the present process and would serve to add an economic burden to the described method. The aforesaid temperatures can be attained by providing heating means surrounding or disposed within the carbon catalyst, e.g., resistance wiring mounted around or within the carbon catalyst.

As the carbon catalyst there can be used any of the common forms of particulate carbon used as catalysts. Charcoal, petroleum coke, coal-derived activated carbon and the like are all commercially available materials. Preferably, activated carbon is used. The carbon can be activated by heating it to temperatures of about 800° C. The particle size of the carbon catalyst should be such as to provide sufficient surface area for the reaction of hydrogen with phosgene, e.g., the carbon can have a particle size range of between about ½ inch and plus 40 mesh or finer.

The carbon catalyst used is substantially free of metals such as copper, aluminum, zinc or the oxides thereof. By the term "metal" in the preceding phrase, is meant elemental metals and compounds thereof, e.g., oxides. By substantially metal-free is meant that the carbon has not been impregnated with metals (as defined) and any such metals that are present are found in minor amounts of impurities.

The amount of catalyst used in the present process will vary depending on the phosgene content of the boron trichloride stream, the volume of the boron trichloride stream to be treated, and the flow rate of such stream through the carbon catalyst. Generally a catalytic amount of carbon will be used, i.e., that amount which will provide sufficient residence time and good intimate contact of the boron trichloride stream with the carbon catalyst to permit the disassociation of phosgene contained in the boron trichloride. In a contemplated embodiment of the present process, the carbon catalyst is disposed in the form of a fixed bed in either a vertical column or horizontal tube and the mixture of hydrogen and boron trichloride passed through the bed. It is contemplated that superficial velocities through the column or tube in the range of 0.5 to 5 centimeters per second at the temperature of operation will be used.

In the practice of the present method in its preferred embodiment, it is contemplated that the carbon catalyst will not require frequent regeneration. However, when required, the catalyst can be regenerated by stopping the flow of boron trichloride through the carbon catalyst and heating the carbon, e.g., to about 800° C., for a time sufficient to remove deactivating species adsorbed thereon. It is contemplated that two catalyst beds will be deployed in a commercial operation. The boron trichloride stream to be purified will be passed through one bed while the other remains in reserve. When the first bed requires regeneration, the boron trichloride stream will be switched to the second bed and the first bed regenerated. When the second bed requires regeneration, the process will be reversed.

When operated in the preferred mode, the effluent stream from the carbon bed will comprise boron trichloride, hydrogen chloride and carbon monoxide. The more volatile components in the effluent stream, e.g., hydrogen chloride and carbon monoxide can be separated from the boron trichloride by condensation of the effluent stream at for example −10° C. The condensate which comprises a colorless liquid (boron trichloride), is substantially free of phosgene, i.e., the boron trichloride contains less than about 0.1 weight percent phosgene. The more volatile acidic components of the effluent stream can be neutralized with alkali or an alkaline reagent before disposal. If desired, the volatile components separated from the boron trichloride can be further processed to recover hydrogen chloride for use in other chemical reactions.

The present process is performed under substantially anhydrous conditions, i.e., less than 25 ppm water, in order to avoid hydrolysis of boron trichloride and thus substantially eliminate diminution of the yield thereof. The present process will also remove chlorine, which is a frequent contaminant of boron trichloride. It provides a method for the removal of phosgene impurity from a stream of boron trichloride by a process requiring relatively mild reaction conditions and permits removal of phosgene continuously from the boron trichloride as it is produced without any intermediate steps.

The present process is more particularly described in the following examples, which are intended as illustrative only since numerous modifications and variations therein will be apparent to those skilled in the art.

EXAMPLE I

A one inch (I.D.) Incoloy 800 pipe, 16 inches long served as the reactor for this example. Twenty grams of activated carbon granules about ⅛ inch in diameter were placed within the pipe to form a carbon catalyst bed about three inches long at approximately the center of the pipe. The carbon bed was supported at either end by a nickel screen and an iron-constantan thermocouple having an Inconel sheath placed in the center of the carbon bed. The thermocouple was connected to a digital readout thermometer. The pipe was placed in an electric furnace, which provided the heat required to heat the carbon bed to the desired temperature.

A synthetic phosgene-containing boron trichloride stream was produced by feeding phosgene and boron trichloride from separate cylinders through rotometers connected to each source to a mixing tube connected by ¼ inch stainless steel tubing to the reactor. A sample port was provided in the tubing. A nitrogen cylinder was connected near the inlet tubes of the rotometers to allow purging of the system with nitrogen.

The gaseous effluent from the reactor was conveyed through ¼ inch stainless steel tubing through a rotometer to a dry ice-acetone condenser connected to a graduated reservoir. The more volatile noncondensable components of the effluent gas stream were vented from the condenser. A sample port was provided in the tubing before the effluent rotometer.

The carbon bed was heated to about 500° C. for 40 minutes under a nitrogen purge to remove any water that was adsorbed on the carbon. Thereafter, the nitrogen purge was shut off and boron trichloride containing about 5.2 weight percent phosgene was introduced into the reactor for about 2½ hours. The feed rate of phosgene was then reduced, and for the next 1½ hours, boron trichloride containing about 2.7 weight percent phosgene was introduced into the reactor. The temperature of the reactor was then increased to about 550° C. and the flow of boron trichloride into the reactor continued for about one hour.

Samples of the reactor inlet and outlet gas streams were taken from time to time during the run and analyzed by infrared spectroscopy. It was found that, at 500° C., about 70 percent of the phosgene in the boron trichloride was destroyed at both levels of phosgene. At 550° C., about 80 percent of the phosgene was destroyed. The graduated reservoir connected to the effluent condenser contained 460 ml. of yellow condensate, which indicated that the capacity of the carbon bed for adsorbing chlorine had been exceeded. The carbon bed was removed from the reactor and found to weigh 22.7 grams.

EXAMPLE II

The reactor of Example I was charged with twenty grams of fresh activated carbon granules as the catalyst, and a hydrogen inlet added to the ¼ inch stainless steel tubing just before the inlet sample port. The carbon catalyst was heated to 500° C. and the system purged with nitrogen for 40 minutes to remove water adsorbed on the carbon. Thereafter, the nitrogen purge was shut off and boron trichloride containing about 2.6 weight percent phosgene introduced into the reactor for about two hours. Hydrogen (133 percent molar excess, based on phosgene) was then introduced into the reactor along with the boron trichloride stream for about 1 hour. During addition of the hydrogen, the temperature of the carbon increased about 22° C. The temperature of the bed was then allowed to fall to about 385°–400° C. and the run continued at those temperatures for about ¾ hour, at which time the reactor was shut down.

Samples of the reactor inlet and outlet gas streams were taken from time to time during the run and analyzed by infrared spectroscopy. It was found that at the start of the run about 100 percent of the phosgene in the boron trichloride was removed; but, after about 2 hours of operation, the amount of phosgene removed by the carbon bed had dropped to about 93 percent and the condensate had changed in color from colorless to pale yellow. When hydrogen was introduced into the reactor, the percentage of phosgene removed increased to about 100 percent and is believed to have continued at that level until the temperature dropped to about 385° C., at which time the percent phosgene removed dropped to about 96 percent.

EXAMPLE III

The apparatus and carbon bed of Example II was used in this example. The reactor was heated to 400° C. and purged with nitrogen for about one hour. Thereafter, the nitrogen purge was shut off and hydrogen (25 percent molar excess based on phosgene), boron trichloride and phosgene (2.6 weight percent based on boron trichloride) flows were started sequentially to the reactor. The run was continued for about 2 hours at which time the hydrogen flow rate was increased to about an 83 percent molar excess. The run was continued under these conditions for about three hours at which time the reactor was shut down.

Samples of the reactor inlet and outlet gas stream were taken from time to time during the run and analyzed by infrared spectroscopy. It was found that about 91 percent of the phosgene was removed initially from the boron trichloride feed and at the end of about 2 hours operation, the percentage of phosgene removed had dropped to about 86 percent. With the increase in the rate of hydrogen to 83 percent molar excess, the percentage of phosgene removed from the boron trichloride leveled off at about 84 percent. The condensate collected in the reservoir remained colorless throughout the entire run, indicating removal of substantially all the chlorine produced in the reactor. The carbon bed was removed from the reactor and found to weight 19.5 grams.

EXAMPLE IV

In order to provide a longer flow path and a longer residence time for the boron trichloride stream, the reactor of Examples I–III was replaced with a ½ inch (⅜ inch I.D.) stainless steel pipe 13 inches long. This reactor was filled with activated carbon granules (30 grams). A stainless steel screen was placed at each end of the pipe to retain the carbon bed. The thermocouple was placed at about the center of the pipe. The remainder of the reactor system remained the same as described in Examples I–III.

The carbon bed was heated to about 400° C. and purged with nitrogen for about one hour. Thereafter, hydrogen (25 percent molar excess based on phosgene), boron trichloride and phosgene (2.6 weight percent based on boron trichloride) were introduced sequentially into the reactor. The run was continued under these conditions for about seven hours, at which time the flow of boron trichloride, phosgene and hydrogen was shut off. The reactor was left overnight at about 400° C. under a low flow of nitrogen. During the aforesaid seven hours of operation, infrared spectra of all samples taken of the reactor effluent indicated that substantially all of the phosgene had been removed from the boron trichloride. The condensate in the reservoir was colorless.

The next morning, the flow of nitrogen was shut off and the run continued under the same conditions as the previous day for about 8 hours. The condensate in the reservoir was colorless throughout the run. Infrared spectra of samples of the reactor effluent taken during the run indicated that better than 99 percent of the phosgene present in the boron trichloride had been destroyed. The carbon bed was removed and found to weigh 28.8 grams.

A portion of the condensate produced in Example IV was bubbled through chilled carbon tetrachloride and an infrared spectrum taken of the resulting solution. The spectra showed nothing but the characteristic peaks for boron trichloride.

EXAMPLE V

The procedure of Example IV was repeated with fresh activated carbon granules except that the sequence of addition was boron trichloride, hydrogen and phosgene, and the reactor was operated at about 400° C. for about one hour and then the reactor temperature was lowered to about 300° C. increased to about 400° C. and then lowered to about 350° C. The condensate remained colorless throughout the run. Analysis of infrared spectra of samples of the reactor effluent indicated that, (1) at 350° C. and 400° C., all or nearly all of the phosgene in the boron trichloride was destroyed, and (2) at 300° C. about 65–70 percent of the phosgene was destroyed. The carbon from the reactor was removed and found to weigh 28.9 grams.

Although the present process has been described with reference to specific details of certain embodiments thereof, it is not intended that such details should be regarded as limitations upon the scope of the invention except as and to the extent that they are included in the accompanying claims.

What is claimed is:

1. A method for removing phosgene from a vaporous stream of boron trichloride containing minor amounts of phosgene as an impurity and simultaneously forming hydrogen chloride, which comprises the step of contacting said vaporous boron trichloride stream in the presence of at least a stoichiometric amount of hydrogen, based on the phosgene impurity, with a substantially metal-free carbon catalyst under substantially anhydrous conditions, said carbon catalyst having a temperature of between about 300° C. and about 700° C., thereby removing phosgene from said boron trichloride stream and producing a hydrogen chloride-containing boron trichloride gas stream.

2. The method of claim 1 wherein the carbon is activated carbon.

3. The method of claims 1 or 2 wherein the hydrogen is used in amounts of from about 25 to about 100 percent molar excess, based on the phosgene impurity.

4. The method of claims 1 or 2 wherein the temperature of the carbon catalyst is from about 350° C. to about 550° C.

5. The method of claim 3 wherein the temperature of the carbon catalyst is from about 400° C. to about 500° C.

6. A method for removing phosgene from a vaporous stream of boron trichloride containing less than about 5 weight percent phosgene as an impurity and simultaneously forming hydrogen chloride, which comprises the step of contacting said vaporous boron trichloride stream simultaneously with a catalytic amount of a catalyst consisting of carbon and at least a stoichiometric amount of hydrogen, based on the phosgene impurity, under substantially anhydrous conditions, said carbon catalyst having a temperature of from about 300° C. to about 700° C., thereby removing phosgene from said boron trichloride stream and producing a hydrogen chloride-containing born trichloride gas stream.

7. The method of claim 6 wherein the carbon is activated carbon.

8. The method of claim 7 wherein the temperature of the carbon catalyst is from about 350° C. to about 550° C. and the hydrogen is used in amounts of from about 25 to about 100 percent molar excess, based on the phosgene impurity.

9. A method for removing phosgene from a vaporous stream of boron trichloride containing minor amounts of phosgene as an impurity and simultaneously forming hydrogen chloride, which comprises admixing at least a stoichiometric amount of hydrogen, based on the phosgene impurity, with said stream and passing the resulting stream through a bed of substantially metal-free carbon under substantially anhydrous conditions, said carbon bed being maintained at temperatures of from about 300° C. to about 700° C., thereby removing phosgene from said boron trichloride stream and producing a hydrogen chloride-containing boron trichloride gas stream.

10. The method of claim 9 wherein from about 25 to about 100 molar percent of excess hydrogen is admixed with the boron trichloride stream.

11. The method of claims 9 or 10 wherein the carbon is activated carbon.

12. The method of claim 11 wherein the carbon is maintained at from about 350° C. to about 550° C.

13. The method of claim 12 wherein the purified boron trichloride is substantially free of phosgene.

* * * * *

UNITED STATES PATENT AND TRADEMARK OFFICE
CERTIFICATE OF CORRECTION

PATENT NO. : 4,238,465
DATED : December 9, 1980
INVENTOR(S) : Duk S. Chun

It is certified that error appears in the above-identified patent and that said Letters Patent are hereby corrected as shown below:

Column 8, line 1, "born" should be --boron--.

Signed and Sealed this

Seventeenth Day of March 1981

[SEAL]

Attest:

RENE D. TEGTMEYER

*Attesting Officer*     *Acting Commissioner of Patents and Trademarks*